US008627575B2

(12) United States Patent
Tang et al.

(10) Patent No.: US 8,627,575 B2
(45) Date of Patent: Jan. 14, 2014

(54) HOOK POSE DETECTING EQUIPMENT AND CRANE

(75) Inventors: Xiujun Tang, Hunan (CN); Dezhi Yang, Hunan (CN); Bin Zhou, Hunan (CN)

(73) Assignees: Hunan Sany Intelligent Control Equipment Co., Ltd. (CN); Sany Automobile Manufacture Co., Ltd. (CN)

( * ) Notice: Subject to any disclaimer, the term of this patent is extended or adjusted under 35 U.S.C. 154(b) by 52 days.

(21) Appl. No.: 13/380,554

(22) PCT Filed: Jun. 25, 2010

(86) PCT No.: PCT/CN2010/074471

§ 371 (c)(1), (2), (4) Date: Dec. 23, 2011

(87) PCT Pub. No.: WO2011/060640

PCT Pub. Date: May 26, 2011

(65) Prior Publication Data

US 2012/0255188 A1 Oct. 11, 2012

(30) Foreign Application Priority Data

Nov. 20, 2009 (CN) .......................... 2009 1 0226102

(51) Int. Cl.
*B23Q 17/00* (2006.01)

(52) U.S. Cl.
USPC ........................................................... 33/333

(58) Field of Classification Search
USPC ............ 33/333, 334, 354; 212/272–275, 277, 212/281
See application file for complete search history.

(56) References Cited

U.S. PATENT DOCUMENTS

| | | | |
|---|---|---|---|
| 3,921,818 | A | 11/1975 | Yamagishi |
| 5,526,946 | A | 6/1996 | Overton |
| 5,645,181 | A | 7/1997 | Ichiba et al. |
| 6,135,301 | A | 10/2000 | Monzen et al. |
| 2007/0200032 | A1 | 8/2007 | Eadie et al. |
| 2009/0139947 | A1 | 6/2009 | Harris et al. |
| 2009/0200256 | A1 | 8/2009 | Vinati et al. |

FOREIGN PATENT DOCUMENTS

| | | | |
|---|---|---|---|
| CN | 101723239 | A | 6/2010 |
| EP | 1757554 | A2 | 2/2007 |

OTHER PUBLICATIONS

Extended European Search Report for Application No. 10831056.6-1705; dated Mar. 21, 2013.
International Search Report for International Application No. PCT/CN2010/074471, mailed Oct. 8, 2010, with English translation.

*Primary Examiner* — G. Bradley Bennett
(74) *Attorney, Agent, or Firm* — Cantor Colburn LLP

(57) ABSTRACT

A hook pose detecting equipment and a crane with the hook pose detecting equipment, in which the hook pose detecting equipment comprises an angle measuring apparatus for obtaining the angle between an axis in a second coordinate system and the corresponding axis in a first coordinate system, an acceleration measuring meter for obtaining the acceleration of the hook in a predetermined direction, a processor for building the first coordinate system and the second coordinate system, and an output equipment. The first coordinate system is relatively fixed with a predetermined location, and the second coordinate system is relatively fixed with the hook. The processor obtains the pose parameters of the hook in the first coordinate system according to the angle obtained by the angle measuring apparatus and the acceleration obtained by the acceleration measuring meter. The operator is able to take appropriate hook-stabilizing measures according to the pose parameters, and thus the efficiency of lifting work is increased.

18 Claims, 3 Drawing Sheets

HOOK POSE DETECTING EQUIPMENT AND CRANE

CROSS REFERENCE TO RELATED APPLICATIONS

This application is the national phase of International Application No. PCT/CN2010/074471, titled "HOOK POSE DETECTING EQUIPMENT AND CRANE", filed on Jun. 25, 2010, which claims the priority of Chinese Patent Application No. 200910226102.4, entitled "HOOK POSE DETECTING EQUIPMENT AND CRANE" filed on Nov. 20, 2009 with State Intellectual Property Office of PRC, which is incorporated herein by reference in its entirety.

FIELD OF THE INVENTION

The present invention relates to a crane control technique, and in particular to a hook attitude detecting device and a crane including this hook attitude detecting device.

BACKGROUND OF THE INVENTION

Cranes are widely applied as lifting and conveying equipments in construction industry, manufacturing industry, and port transportation industry. There are various kinds of cranes, each kind of which is of a different structure. For a truck crane, it includes a chassis, a slewing mechanism, a lifting arm, a hook and a hoisting mechanism. The lifting arm has a lower part connected with the chassis by the slewing mechanism and an upper part on which the hook is hung by a wire rope wound around a pulley block to be connected to the hoisting mechanism. In the hoisting mechanism, the hook is driven by the wire rope to make movements such as rising, stop and lowering; while the lifting arm may rotate about a vertical axis under the driving of the slewing mechanism, so as to move the hook in a horizontal plane.

In the hoisting operation of a crane, there are many steps to be performed, which generally include lowering a hook, hoisting, laterally moving and subsequently lowering the hook, etc. In lowering of the hook, a hoisting drum of the hoisting mechanism rotates in one direction, and the hook brings the wire rope to move downwardly under gravity, till the hook reaches a suitable position above the goods to be hoisted, and then the hook is fixed to the goods to be hoisted. In hoisting, the hoisting drum of the hoisting mechanism rotates in an opposite direction, and the hook and the goods are moved together upwardly by the pulling of the wire rope, thus the goods goes away from the ground. After the goods has been moved away from the ground, the slewing mechanism is operated and the step of the laterally moving begins. The lifting arm laterally rotates, and the hook laterally moves together with the goods, so as to allow the goods to arrive above a predetermined position. In subsequently lowering of the hook, the hoisting drum rotates reversely again after the goods arrives above the predetermined position, and the goods and the hook moves downwardly, so as to allow the goods to reach the predetermined position, thereby performing the transposition of the goods. In hoisting, the hook moves not only in a vertical direction but also in a lateral direction. Due to inertia and an external force, the hook hung on the upper part of the lifting arm by a wire rope and the goods may sway accordingly, in particular when the hook carrying the goods begins to move laterally or stops laterally moving after the goods reaches the predetermined position, the swaying amplitude of the hook and the goods may be increased.

The swaying of the hook may affect the efficiency of the hoisting operation of the crane. When the hook is lowered, in order to keep the hook stable relative to the goods and avoid the collision between the hook and the goods, it is necessary to wait for a suitable period of time, until the hook stops swaying. In the laterally moving of the hoisted goods, in order to avoid the collision caused by swaying of the goods, it is also necessary to move the hook and the goods at a relatively low speed. After the hoisted goods reaches the predetermined position, in order to accurately place the goods onto the predetermined position, it is also necessary to lower the hook after the goods stops swaying. Currently, in the filed of crane, there is a common problem that the hoisting time is prolonged due to the swaying of the hook, which reduces the hoisting efficiency of the crane.

The above-mentioned problems occur not only in the hoisting operation of a truck crane, but also in the hoisting operation of a gantry crane or other types of cranes.

In view of the above-mentioned problems, the swaying amplitude of the hook is currently reduced by taking a anti-swaying hook-stabilizing measures, so as to more quickly stop the swaying of the hook and thus to reduce the adverse effects of swaying hook on the efficiency of the hoisting operation. In the anti-swaying hook-stabilizing measures, a control device is generally used to move the hook at a suitable frequency and amplitude in the direction opposite to the swaying direction, based on the swaying amplitude, frequency and direction of the hook, so as to stop the hook in a shorter time. Presently, the anti-swaying hook-stabilizing measures substantially depend on the appropriate control on the hook by experienced operator.

In order to reduce the dependence on the operating experience of the operator, the European patent document EP1757554 disclosed an anti-swaying control technique for a crane. In the technical solution disclosed in this patent document, attitude parameters of a hook or goods are predetermined in a preset mode, and a control system takes a proper anti-swaying measures according to the predetermined attitude parameters to reduce the adverse effects of swaying on the hoisting operation. One principle of this technical solution is that the movement situation of a hook, i.e., attitude parameters of the hook, in hoisting operation is predetermined; and a control strategy is determined according to the predetermined attitude parameters of the hook to allow the hook move in a predetermined way, so as to reduce the swaying amplitude of the hook and thus to stop the hook more quickly, thereby reducing the adverse effects of the swaying hook on the efficiency of the hoisting operation. However, due to the complexity of the actual hoisting operation, it is difficult for the predetermined attitude parameters of the hook to be identical with the actual attitude parameters, thus this technical solution is only applicable in a stable hoisting operation environment. When a hoisting operation is performed in an operation environment where the attitude parameters of a hook are not predetermined, the above technical solution will not increase the efficiency of the hoisting operation of the crane.

In a hoisting operation, one technical difficulty in the crane field is to determine the actual attitude parameters of a hook and provide a basis for controlling the movement of the hook so as to increase the efficiency of the hoisting operation of a crane.

SUMMARY OF THE INVENTION

In view of the above-mentioned technical difficulty, a first object of the present invention is to provide a hook attitude detecting device, for determining actual attitude parameters of a hook and providing a basis for controlling the movement of the hook.

A second object of the present invention is to provide a crane with the above-mentioned hook attitude detecting device, in which the movement state of a hook is known according to actual attitude parameters of the hook and hook-stabilizing measures may be taken to increase the efficiency of the hoisting operation of the crane.

To achieve the first object mentioned above, a hook attitude detecting device according to the present invention includes:

an angle measuring instrument configured to obtain an angle between a coordinate axis of a second coordinate system and a corresponding coordinate axis of a first coordinate system in real time;

an acceleration measuring meter configured to obtain an acceleration of a hook in a predetermined direction in real time, there being a predetermined angle between the predetermined direction and the coordinate axis of the second coordinate system;

a processor configured to establish the first coordinate system and the second coordinate system, wherein the first coordinate system is fixed relative to a predetermined position and the second coordinate system is fixed relative to the hook, the coordinate axis of the first coordinate system corresponds to the coordinate axis of the second coordinate system; and attitude parameters of the hook in the first coordinate system may be obtained from the angle obtained by the angle measuring instrument and the acceleration obtained by the acceleration measuring meter; and an output device configured to output the attitude parameters.

Preferably, the first coordinate system is a rectangular coordinate system including a X1 axis, a Y1 axis and a Z1 axis, and the second coordinate system is a rectangular coordinate system including a X2 axis, a Y2 axis and a Z2 axis, with the X1 axis, the Y1 axis and the Z1 axis respectively corresponding to the X2 axis, the Y2 axis and the Z2 axis.

Preferably, the angle measuring instrument is a triaxial angle measuring instrument, and there are predetermined angles between axes of three measuring shafts of the triaxial angle measuring instrument and the three coordinate axes of the second coordinate system, respectively.

Preferably, the predetermined angles between the axes of the three measuring shafts of the triaxial angle measuring instrument and the three coordinate axes of the second coordinate system are all equal to zero degree.

Preferably, the acceleration measuring meter is a triaxial acceleration measuring meter, and there are predetermined angles between axes of three measuring shafts of the triaxial acceleration measuring meter and the three coordinate axes of the second coordinate system, respectively.

Preferably, the predetermined angles between the axes of the three measuring shafts of the acceleration measuring meter and the three coordinate axes of the second coordinate system are all equal to zero degree.

Preferably, the output device includes a display device which displays the attitude parameters in a form of a schematic diagram.

Preferably, the attitude parameters include at least one of instantaneous speed, movement direction and position of the hook in the first coordinate system.

Preferably, the processor can further compare the attitude parameters with predetermined threshold values of the parameters so as to determine the security of a hoisting operation, and can perform a predetermined processing according to a comparison result.

To achieve the second object mentioned above, a crane according to the present invention includes a body of the crane, a hanging wire rope and a hook, wherein the hanging wire rope has a lower end connected with the hook and an upper end connected with a fixed pulley on body of the crane, and differs from the prior art in further including any hook attitude detecting device mentioned above, wherein the angle measuring instrument and the acceleration measuring meter of the hook attitude detecting device are both fixed to the hanging wire rope or to the hook.

In the hook attitude detecting device according to the present invention, the processor establishes the first coordinate system and the second coordinate system in space, and obtains attitude parameters of the hook based on these two coordinate systems to know the movement state of the hook. The first coordinate system is fixed relative to a predetermined position which may be fixed relative to related parts of the crane, and the second coordinate system is associated with the movement of the hook, such that the movement state of the hook may be reflected by the relative movement state between these two coordinate systems. The angle measuring instrument is utilized to obtain the angle between the coordinate axis of the second coordinate system and the corresponding coordinate axis of the first coordinate system. The acceleration measuring meter is utilized to obtain the acceleration of the hook in the predetermined direction fixed relative to the second coordinate system and being at the predetermined angle relative to the coordinate axis of the second coordinate system so as to provide a basis for obtaining the acceleration of the hook in the direction of each coordinate axis of the second coordinate system. The processor also can obtain accelerations of the hook in the respective coordinate axes of the first coordinate system according to the acceleration obtained by the acceleration measuring meter and the angle obtained by the angle measuring instrument; and can obtain the attitude parameters of the hook according to the accelerations of the hook in the respective coordinate axes of the first coordinate system, so as to determine the movement state of the hook. Then, the attitude parameters obtained by the processor may be output by an output device in a suitable manner. The above-mentioned hook attitude detecting device according to the present invention may provide attitude parameters of a hook, thus a control system of a crane or an operator may accurately know information such as position, operating speed and swaying amplitude of the hook from the attitude parameters output by an output device so as to determine the movement state of the hook, and then take suitable hook-stabilizing measures according to the movement state of the hook, so as to reduce the time required for the hoisting operation and improve the efficiency of the hoisting operation.

In a further technical solution, the first coordinate system and the second coordinate system both are rectangular coordinate systems including three coordinate axes. In such a technical solution, more attitude parameters of a hook can be obtained by the three coordinate axes. Further, a control system of a crane or an operator can more accurately determine information of the hook in a three-dimensional space and take hook-stabilizing measures better.

In a further technical solution, the angles between the corresponding coordinate axes of the two coordinate systems are obtained by the triaxial angle measuring instrument. In this way, on the one hand, the measuring accuracy can be increased, and on the other hand, the data of the angles can be obtained more quickly, thereby improving the responding speed of the hook attitude detecting device. In a preferred technical solution, the axes of the three measuring shafts of the triaxial angle measuring instrument are respectively parallel to the three coordinate axes of the second coordinate system, which can reduce the processing steps of the angle measuring instrument and improve the processing speed of the angle measuring instrument.

Similarly, in a further technical solution, the acceleration of a hook in each direction is obtained by the triaxial acceleration measuring meter, which can improve the measuring accuracy and the responding speed of the hook attitude detecting device. In a preferred technical solution, the axes of the three measuring shafts of the triaxial acceleration measuring meter are respectively parallel to the three coordinate axes of the second coordinate system, which can reduce the processing steps of the acceleration measuring meter and improve the processing speed of the acceleration measuring meter.

In a further technical solution, the output device includes the display device by which the attitude parameters of the hook may be illustrated in a form of a schematic diagram. This technical solution can provide visualized operating information for an operator, such that the operator may take hook-stabilizing measures better to facilitate improving the efficiency of the hoisting operation.

In a further technical solution, the processor may compare the obtained attitude parameters of the hook with predetermined threshold values of the parameters, and judge according to the predetermined strategy whether the position and the speed of the hook is out of the predetermined range or not; and then determine whether to perform related processing or not according to the judgment result; and output a predetermined indication to further remind the operator if it is necessary to perform the predetermined processing. By means of this technical solution, the efficiency of the hoisting operation is improved while the safety accidents are reduced or avoided.

Based on the above-mentioned hook attitude detecting device, the present invention further provides a crane including the above-mentioned hook attitude detecting device. Since the hook attitude detecting device has the above-mentioned technical effects, the crane including the above-mentioned hook attitude detecting device also has corresponding technical effects.

DETAILED DESCRIPTION

The spirit of the present invention is to establish a first coordinate system and a second coordinate system, wherein the second coordinate system is concerned with the movement of a hook while the first coordinate system is independent of the movement of the hook, thus the change of attitude parameters of the hook may be reflected by the change of a position relation between such two coordinate systems; then, an angle relation between the coordinate axes of these two coordinate systems is obtained by an angle measuring instrument, and an acceleration of the hook in a predetermined direction of the second coordinate system is obtained by an acceleration measuring meter, thus the accelerations of the hook in the corresponding coordinate axes of the first coordinate system are obtained according to the angle relation and the acceleration; finally, the attitude parameters of the hook in the first coordinate system are obtained according to the accelerations of the hook in the coordinate axes of the first coordinate system, so as to provide a basis for further controlling the movement of the hook.

The technical solutions of the present invention will be described hereinafter by way of specific embodiments. The description in this section of the specification is only illustrative and explanatory, and should not be considered to limit the protection scope of the present invention.

Figure 1:
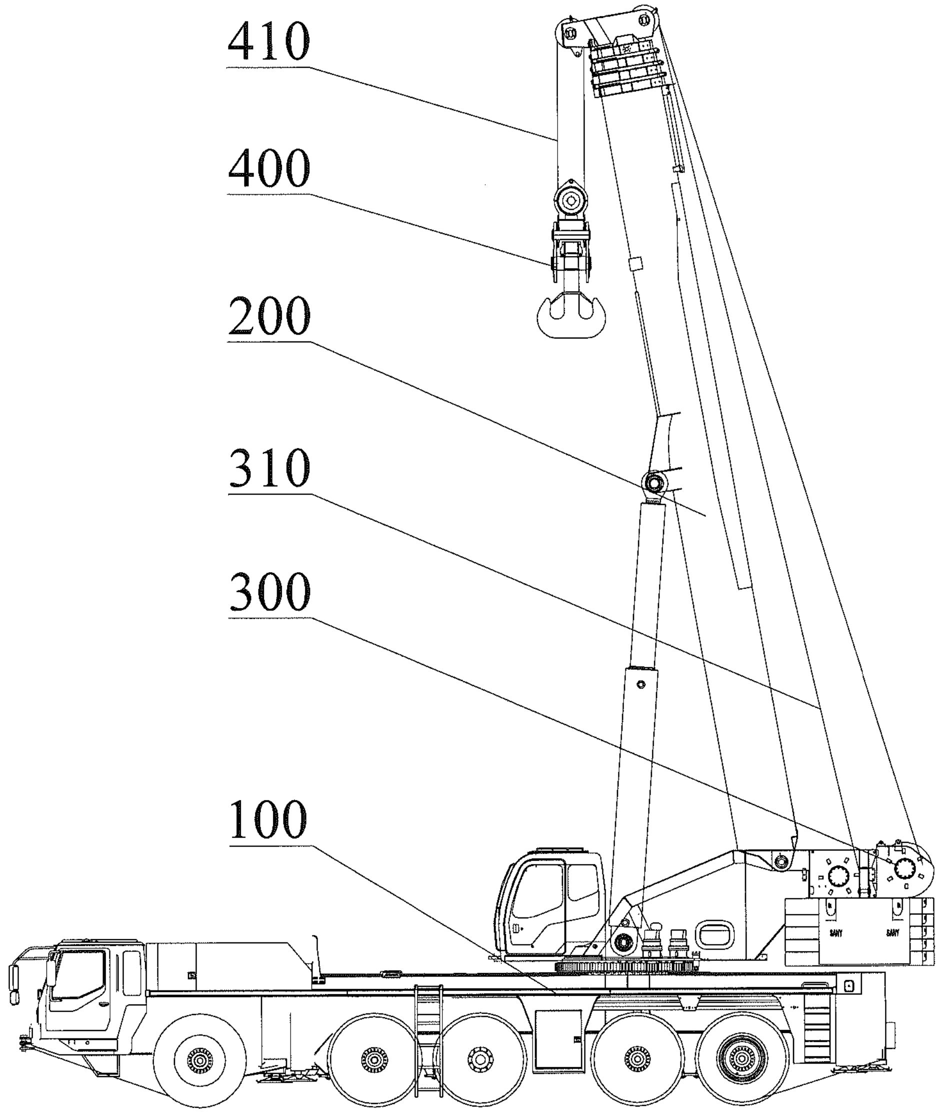
FIG. 1 is a general structural schematic view of a truck crane.

Referring to FIG. 1, a general structural schematic view of a truck crane is shown. The truck crane in FIG. 1 includes a chassis 100, a lifting arm 200 and a hook 400. The lifting arm 200 is installed on the chassis 100 by a slewing mechanism, so as to can rotate about a vertical axis in a horizontal plane relative to the chassis 100. A movable pulley set is provided on the hook 400 and is connected with a fixed pulley set on an upper part of the lifting arm 200 by a hanging wire rope 410. The fixed pulley set is connected to a hoisting drum 300 of the crane by a pulling wire rope 310. In hoisting operation, the hanging wire rope 410 is driven by the pulling wire rope 310 through the fixed pulley set, thus the hook 400 is moved in a vertical direction and the hoisted goods is moved in the vertical direction. The slewing mechanism between the lifting arm 200 and the chassis 100 is rotated under the driving of a suitable driving mechanism, which moves the lifting arm 200 relative to the chassis 100, and causes the hook 400 and the hoisted goods to move in the horizontal plane, thus the position of the goods is changed. The rotation of the lifting arm 200 or an external force may causes the hook 400 hung on the upper part of the lifting arm 200 by the hanging wire rope 410 to sway laterally, and the laterally swaying may affect the efficiency of the hoisting operation of the crane.

Figure 2:
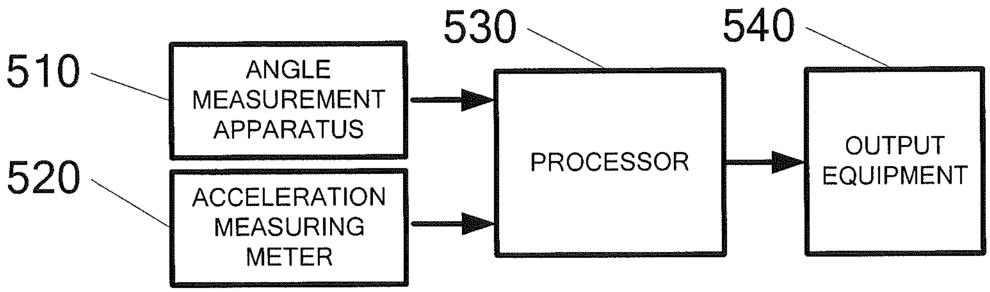
FIG. 2 is a structural block diagram of a hook attitude detecting device according to a first embodiment of the present invention.

Referring to FIG. 2, a structural block diagram of a hook attitude detecting device according to a first embodiment of the present invention is shown. The hook attitude detecting device according to the first embodiment is used to measure the attitude parameters of the above-mentioned hook of the crane, and includes an angle measuring instrument 510, an acceleration measuring meter 520, a processor 530 and an output device 540.

The processor 530 may establish two coordinate systems according to the structural dimension of the crane, i.e. a first coordinate system O1 and a second coordinate system O2, with coordinate axes of the first coordinate system O1 corresponding to coordinate axes of the second coordinate system O2, respectively. The first coordinate system O1 and the second coordinate system O2 are fixed relative to different devices, respectively. Specifically, the second coordinate system O2 is fixed relative to the hook 400, and the second coordinate system O1 is fixed relative to an upper part of the lifting arm 200. Thus, the relative position between these two coordinate systems may be changed when the hook 400 sways or moves up and down relative to the lifting arm 200, therefore, the change of the attitude parameters of the hook 400 may be reflected on the change of the position relation between these two coordinate systems, which provides a basis for determining the attitude parameters of the hook 400.

The first coordinate system O1 is not limited to be fixed relative to the upper part of the lifting arm 200, and may be also fixed relative to other parts of the crane in addition to the hook 400. If the crane is of other type of crane, such as a gantry crane, the processor 530 may establish a coordinate system based on a predetermined spatial position according to the actual requirement of the operation. As long as the change of the movement and attitude parameters of the hook 400 can be reflected by the change of the position relation between the first coordinate system O1 and the second coordinate system O2 during a hoisting operation, the attitude parameters of the hook 400 may be determined, thus the object of the present invention may be achieved.

Figure 3:
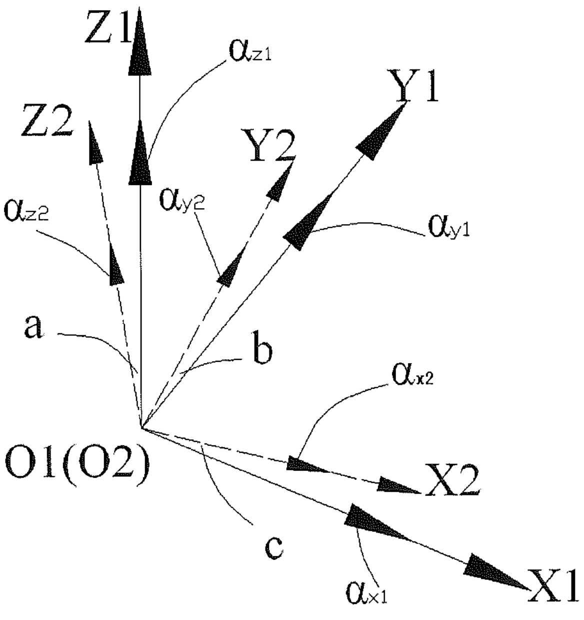
FIG. 3 is a schematic view showing position relation between an angle measuring instrument, an acceleration measuring meter and a hook in the first embodiment.

In the first embodiment shown in FIG. 3, a schematic view showing the comparison between the first coordinate system and the second coordinate system is shown, where the coordinate axes of the first coordinate system is shown in solid line while the coordinate axes of the second coordinate system is shown in dashed line. In the embodiment, the first coordinate system O1 and the second coordinate system O2 both are three-dimensional rectangular coordinate systems. The first coordinate system O1 includes three coordinate axes, which are a X1 axis, a Y1 axis and a Z1 axis; and the second coordinate system O2 includes three coordinate axes, which are a X2 axis, a Y2 axis and a Z2 axis; with the X1 axis, the Y1 axis and the Z1 axis respectively corresponding to the X2 axis, the Y2 axis and the Z2 axis.

The angle measuring instrument 510 is adapted to obtain the angles between the coordinate axes of the second coordinate system O2 and the corresponding coordinate axes of the first coordinate system O1. In the embodiment, the angle measuring instrument is a triaxial angle measuring instrument which includes three measuring shafts. The axes of the three measuring shafts are respectively parallel to the three coordinate axes of the second coordinate system O2, that is to say, the angles between the axes of the three measuring shaft and the three coordinate axes of the second coordinate system O2 are all equal to zero degree. Thus, when the second coordinate system O2 rotates relative to the first coordinate system O1, the angles between the three coordinate axes of the second coordinate system O2 and the corresponding coordinate axes of the first coordinate system O1 may be obtained by respective measuring shafts. As shown in FIG. 3, an angle "a" between the Z1 axis and the Z2 axis, an angle "b" between the Y1 axis and the Y2 axis, an angle "c" between the X1 axis and the X2 axis may be obtained by the angle measuring instrument 510. It is understood that the angle measuring instrument may also include three angle sensors, each of which is utilized to measure the angle between each pair of coordinate axes.

The acceleration measuring meter 520 is adapted to measure an acceleration of the hook in a predetermined direction being at predetermined angles relative to the coordinate axes of the second coordinate system O2. In the embodiment, the acceleration measuring meter 520 is a triaxial acceleration measuring meter which includes three measuring shafts. The axes of the three measuring shafts are respectively parallel to the three coordinate axes of the second coordinate system O2, that is to say, the angles between the axes of the three measuring shaft and the three coordinate axes of the second coordinate system O2 are all equal to zero degree. Thus, the acceleration in the direction of each coordinate axis of the second coordinate system O2 may be obtained by the acceleration measuring meter 520. As shown in FIG. 3, an acceleration "$\alpha_{x2}$" along the X2 axis, an acceleration "$\alpha_{y2}$" along the Y2 axis, an acceleration "$\alpha_{z2}$" along the Z2 axis may be obtained by the acceleration measuring meter 520. It is understood that the three measuring shafts of the triaxial acceleration measuring meter may be at predetermined angles relative to the three coordinate axes of the second coordinate system O2 respectively, rather than being parallel to the three coordinate axes of the second coordinate system O2. Thus, after the accelerations in the direction of the respective axes of the three measuring shafts are obtained, the accelerations $\alpha_{x2}$, $\alpha_{y2}$, $\alpha_{z2}$ of the hook 400 in the direction of the coordinate axes of the second coordinate system O2 may be obtained by calculating.

Figure 4:
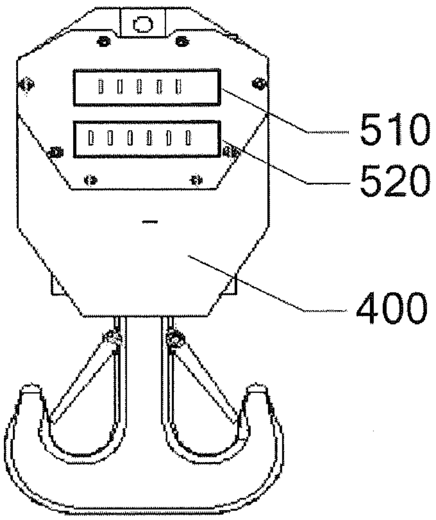
FIG. 4 is a schematic view showing the comparison between a first coordinate system and a second coordinate system in the first embodiment, where coordinate axes of the first coordinate system are shown in solid line and coordinate axes of the second coordinate system are shown in dashed line.

As shown in FIG. 4, a schematic view showing the position relation between the angle measuring instrument, the acceleration measuring meter and the hook is shown. In the embodiment, the angle measuring instrument 510 and the acceleration measuring meter 520 are fixed relative to the hook 400, so that the date obtained by the angle measuring instrument 510 and the acceleration measuring meter 520 may directly relate to the movement state of the hook 400. In addition, the angle measuring instrument 510 and the acceleration measuring meter 520 may be fixed relative to the hanging wire rope 410 of the hanging hook 400. The attitude parameters of the hook 400 may be determined according to the attitude parameters of the hanging wire rope 410, since the movement of the hanging wire rope 410 may be synchronized with that of the hook 400 and there is a certain relation between the attitude parameters and the movement state of the hanging wire rope 410 and the hook 400, thus the object of the present invention may be achieved.

The processor 530 is also adapted to obtain the attitude parameters of the hook 400 in the first coordinate system O1 according to the angles obtained by the angle measuring instrument 510 and the accelerations obtained by the acceleration measuring meter 520. The attitude parameters may include a movement speed V, a movement direction and a position of the hook 400 in the first coordinate system.

The output device 540 outputs the attitude parameters obtained by the processor 530, so as to provide for the operator or the operating system of the crane.

The specific method of obtaining the above-mentioned attitude parameters will be described in following.

Firstly, the acceleration of the hook 400 in the direction of each coordinate axis of the first coordinate system O1 is obtained; where, in the first coordinate system O1, the acceleration in the direction of X1 axis is $\alpha_{x1}=\alpha_{x2}\times\cos c$, the acceleration in the direction of Y1 axis is $\alpha_{y1}=\alpha_{y2}\times\cos b$, and the acceleration in the direction of Z1 axis is $\alpha_{z1}=\alpha_{z2}\times\cos a$. In this way, the acceleration of the hook 400 in the direction of each coordinate axis of the first coordinate system O1 may be obtained.

Secondly, the processor 530 performs a processing at a predetermined period and obtains an instantaneous speed of the hook in the direction of each coordinate axis of the first coordinate system O1 according to the obtained $\alpha_{x1}$, $\alpha_{y1}$, $\alpha_{z1}$ by the following equations:

$$V_x=V_{0x}+\int\alpha_{x1}dt$$

$$V_y=V_{0y}+\int\alpha y_1 dt$$

$$V_z=V_{0z}+\int\alpha z_1 dt$$

where, $V_x$ indicates an instantaneous speed of the hook 400 in the direction of X1 axis, $V_y$ indicates an instantaneous speed of the hook 400 in the direction of Y1 axis, $V_z$ indicates the instantaneous speed of the hook in the direction of Z1 axis, and the instantaneous speed is the real-time speed of the hook 400 obtained by the processor 530; $V_{0x}$, $V_{0y}$ and $V_{0z}$ are respectively the initial speeds in the directions of X1 axis, Y1 axis and Z1 axis, that is, the speeds obtained by the processor 530 in a previous processing period, and "dt" indicates the processing period of the processor 530. Thus, in the first coordinate system O1, the instantaneous speed in the direction of each coordinate axis of the first coordinate system O1 may be obtain according to a discrete function of the acceleration associated with the time. The hook attitude detection device may start operating when the hoisting operation of the crane is performed, and preset the values of the $V_{0x}$, $V_{0y}$ and $V_{0z}$ according to the state on the beginning of the hoisting so as to enable the processor 530 to obtain the instantaneous speed in the direction of each coordinate axis of the first coordinate system O1 according to the angles obtained by the angle measuring instrument 510 and the accelerations obtained by the acceleration measuring meter 520. The instantaneous speed may reflect the real-time movement state of the hook 400, and the real-time attitude parameters of the hook 400 may be further determined according to the instantaneous speed.

Figure 5:
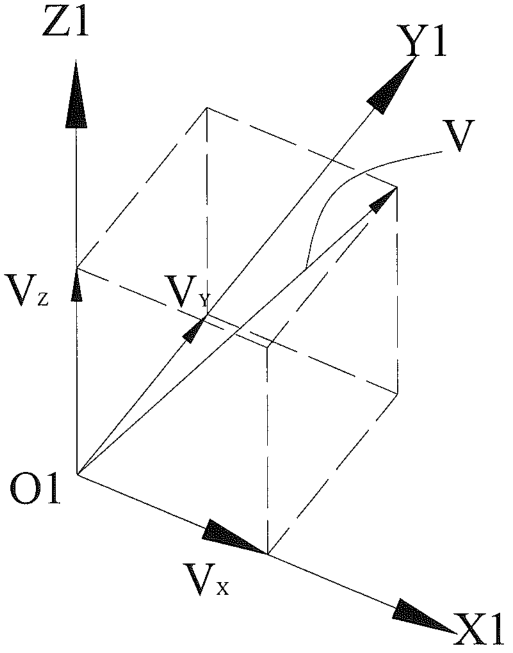
FIG. 5 is a schematic view showing a movement vectorial resultant of the hook in the first embodiment.

As shown in FIG. 5, a schematic view showing the movement vectorial resultant of the hook is shown. The instantaneous speed V of the hook 400 in the first coordinate system O1 may be obtained according to the relation between $V_x$, $V_y$ and $V_z$, and this instantaneous speed is the overall speed of the hook 400, where $$V=\sqrt{V_x^2+V_Y^2+V_Z^2}.$$

Then, the movement position of the hook 400 may be obtained and determined according to the distance between the hook 400 and the predetermined position. Since a movement track of the hook 400 is nonlinear, in order to accurately obtain the distance between the hook 400 and the predetermined position, the instantaneous displacement of the hook 400 in the direction of each coordinate axis of the first coordinate system O1 relative to the predetermined position may be obtained at first, where:

the instantaneous displacement in the direction of the X1 axis is $S_x=S_{0x}+\iint\alpha_{x1}dt$, the instantaneous displacement in the direction of the Y1 axis is $S_Y=S_{0Y}+\iint\alpha_{x1}dt$, and the instantaneous displacement in the direction of the Z1 axis is $S_Z=S_{0Z}+\iint\alpha z_1 dt$.

In the above formulas, $S_{0x}$, $S_{0y}$ and $S_{0z}$ are respectively the initial distances in the direction of the X1 axis, the Y1 axis and the Z1 axis between the hook 400 and the predetermined position, that is, the instantaneous displacements obtained by the processor 530 in a previous processing period; "dt" indicates the processing period of the processor 530. Thus, in the first coordinate system O1, the instantaneous displacement of the hook 400 in the direction of each coordinate axis of the first coordinate system O1 may be obtained according to a discrete function of the acceleration associated with the time, and the instantaneous distance in the direction of each coordinate axis between the hook 400 and the predetermined position is obtained. Taking the stationary position of the hook as a reference, the offset amount of the hook 400 in the direction of each coordinate axis may be determined, so as to determine the swaying distance and amplitude. Further, the instantaneous displacement S of the hook 400, which is overall displacement of the hook 400, in the first coordinate system O1 may be obtained according to $S_X$, $S_Y$, $S_Z$, so as to determine the instantaneous distance between the hook 400 and the predetermined position, that is:

$$S=\sqrt{S_x^2+S_Y^2+S_Z^2}.$$

Similarly, taking the stationary position of the hook as a reference, the position and the swaying amplitude of the hook 400 may be determined.

According to the above-mentioned attitude parameters obtained by the processor 530, the operator may accurately know information of the hook 400 such as the position, the instantaneous speed and the swaying amplitude to determine the movement state of the hook 400, so as to can take more suitable hook-stabilizing measures to reduce the time required for the hoisting operation and to improve the efficiency of the hoisting operation.

In actual hoisting operation, the above-mentioned object of the invention may achieved by two two-dimensional coordinate systems. The first coordinate system O1 and the second coordinate system O2 are not limited to rectangular coordinate systems, and also may be polar coordinate systems or other coordinate systems. In the case that the first coordinate system O1 and the second coordinate system O2 both include one coordinate axis or two coordinate axes, the angle measuring instrument 510 may include one measuring shaft or two measuring shafts, and the axis of each measuring shaft is parallel to or is at a predetermined angle relative to a coordinate axis of the second coordinate system O2. Similarly, the angle between the corresponding coordinate axes of the two coordinate systems may be obtained in the above-mentioned manner, so as to further obtain the accelerations of the hook 400 in the direction of the corresponding coordinate axis of the first coordinate system O1 according to the angle and the acceleration obtained by the acceleration measuring meter 520, and to further obtain the attitude parameters of the hook 400.

Similarly, in the case that the first coordinate system O1 and the second coordinate system O2 are other types of coordinate systems, the acceleration measuring meter 520 may also include one measuring shaft or two measuring shafts, and the axis of each measuring shaft is parallel to or is at a predetermined angle relative to a coordinate axis of the second coordinate system O2, and the acceleration of the hook 400 in the direction of the corresponding coordinate axis of the second coordinate system O2 can be obtained likewise in the above-mentioned manner, so as to achieve the object of the present invention. In order to obtain the acceleration of the hook 400 more accurately, the preferred technical solution is that the acceleration measuring meter has the function of measuring the acceleration in three dimensional directions, so as to more accurately obtain the components of acceleration in the direction of the predetermined coordinate axis.

In order to allow the operator to more directly determine the attitude of the hook 400, the output device 540 may be an indicating light which makes a predetermined indication when the predetermined attitude parameters of the hook 400 reach to a predetermined value; or may be a display device by which the attitude parameters of the hook is displayed in a suitable way, for example, the position and the movement track of the hook 400 may be displayed on the display device in the form of a schematic diagram, so that the operator may know the position of the hook 400 according to the schematic drawing displayed on the display device and determine the swaying amplitude of the hook 400. In addition, the processor 530 may preset threshold values of the parameters according to an actual requirements of the hoisting operation and the actual conditions of the hook 400, and compare the obtained predetermined attitude parameters of the hook 400 with the preset threshold values of the parameters, so as to determine whether the movement state of the hook 400 affects the normal hoisting operation or not, and then to perform a predetermined processing according to the comparison result. For example, it is possible to preset a speed threshold value of the hook 400, so that a corresponding processing is performed when the speed of the hook 400 is excessively high. It is also possible to set a swaying amplitude threshold value, so that a corresponding predetermined processing is performed when the position of the hook 400 is out of the swaying amplitude threshold value. The predetermined processing may be to give a suitable alarm, generate a suitable signal or the like, or may be to force the crane to stop operating by a control system of the crane in the case of occurring large security risks.

Since the hook attitude detecting device according to the present invention has the above technical effects, the crane including the above-mentioned hook attitude detecting device also has corresponding technical effects. In order to facilitate the information communication and to facilitate for the operator knowing the condition of the hook 400, the processor 530 and the angle measuring instrument 510 may be both fixed to the hook 400 or the hanging wire rope 410, and the output device 540 may be installed in a control cab, and may be in a wireless communication with the processor 530.

The above-mentioned description is just the preferred embodiments of the present invention. It should be noted that some improvements and modifications may be made by the skilled in the art without departing from the principle of the present invention, for example, the angle measuring instrument 510 may be an angle sensor, a magnetometer, a gyroscope, etc., and the processor 530 may also include a filtering device, an AD converter, etc. These improvements and modifications should be deemed to fall into the scope of protection of the present invention.

What is claimed is:

1. A hook attitude detecting device, comprising:

an angle measuring instrument configured to obtain an angle between a coordinate axis of a second coordinate system and a corresponding coordinate axis of a first coordinate system in real time;

an acceleration measuring meter configured to obtain an acceleration of a hook in a predetermined direction in real time, there being a predetermined angle between the predetermined direction and the coordinate axis of the second coordinate system;

a processor configured to establish the first coordinate system and the second coordinate system, wherein the first coordinate system is fixed relative to a predetermined position and the second coordinate system is fixed relative to the hook, the coordinate axis of the first coordinate system corresponds to the coordinate axis of the second coordinate system; and attitude parameters of the hook in the first coordinate system are obtained from the angle obtained by the angle measuring instrument and the acceleration obtained by the acceleration measuring meter; and an output device configured to output the attitude parameters.

2. The hook attitude detecting device according to claim 1, wherein the first coordinate system is a rectangular coordinate system comprising a X1 axis, a Y1 axis and a Z1 axis, and the second coordinate system is a rectangular coordinate system comprising a X2 axis, a Y2 axis and a Z2 axis, with the X1 axis, the Y1 axis and the Z1 axis respectively corresponding to the X2 axis, the Y2 axis and the Z2 axis.

3. The hook attitude detecting device according to claim 2, wherein the angle measuring instrument is a triaxial angle measuring instrument, and there are predetermined angles between axes of three measuring shafts of the triaxial angle measuring instrument and the three coordinate axes of the second coordinate system, respectively.

4. The hook attitude detecting device according to claim 3, wherein the predetermined angles between the axes of the three measuring shafts of the angle measuring instrument and the three coordinate axes of the second coordinate system are all equal to zero degree.

5. The hook attitude detecting device according to claim 2, wherein the acceleration measuring meter is a triaxial acceleration measuring meter, and there are predetermined angles between axes of three measuring shafts of the triaxial acceleration measuring meter and the three coordinate axes of the second coordinate system, respectively.

6. The hook attitude detecting device according to claim 5, wherein the predetermined angles between the axes of the three measuring shafts of the acceleration measuring meter and the three coordinate axes of the second coordinate system are all equal to zero degree.

7. The hook attitude detecting device according to claim 1, wherein the output device comprises a display device which displays the attitude parameters in a form of a schematic diagram.

8. The hook attitude detecting device according to claim 1, wherein the attitude parameters comprise at least one of instantaneous speed, movement direction and position of the hook in the first coordinate system.

9. The hook attitude detecting device according to claim 1, wherein the processor can further compare the attitude parameters with predetermined threshold values of the parameters so as to determine the security of a hoisting operation, and can perform a predetermined processing according to a comparison result.

10. A crane, comprising a lifting arm, a hanging wire rope, a hook and the hook attitude detecting device according to claim 1, wherein the hanging wire rope has a lower end connected with the hook and an upper end connected with a fixed pulley on the lifting arm, the angle measuring instrument and the acceleration measuring meter of the hook attitude detecting device are both fixed to the hanging wire rope or to the hook.

11. The crane according to claim 10, wherein the first coordinate system is a rectangular coordinate system comprising a X1 axis, a Y1 axis and a Z1 axis, and the second coordinate system is a rectangular coordinate system comprising a X2 axis, a Y2 axis and a Z2 axis, with the X1 axis, the Y1 axis and the Z1 axis respectively corresponding to the X2 axis, the Y2 axis and the Z2 axis.

12. The crane according to claim 11, wherein the angle measuring instrument is a triaxial angle measuring instrument, and there are predetermined angles between axes of three measuring shafts of the triaxial angle measuring instrument and the three coordinate axes of the second coordinate system, respectively.

13. The crane according to claim 12, wherein the predetermined angles between the axes of the three measuring shafts of the angle measuring instrument and the three coordinate axes of the second coordinate system are all equal to zero degree.

14. The crane according to claim 11, wherein the acceleration measuring meter is a triaxial acceleration measuring meter, and there are predetermined angles between axes of three measuring shafts of the triaxial acceleration measuring meter and the three coordinate axes of the second coordinate system, respectively.

15. The crane according to claim 14, wherein the predetermined angles between the axes of the three measuring shafts of the acceleration measuring meter and the three coordinate axes of the second coordinate system are all equal to zero degree.

16. The crane according to claim 10, wherein the output device comprises a display device which displays the attitude parameters in a form of a schematic diagram.

17. The crane according to claim 10, wherein the attitude parameters comprise at least one of instantaneous speed, movement direction and position of the hook in the first coordinate system.

18. The crane according to claim 10, wherein the processor can further compare the attitude parameters with predetermined threshold values of the parameters so as to determine the security of a hoisting operation, and can perform a predetermined processing according to a comparison result.

* * * * *